(12) United States Patent  
Rolf et al.

(10) Patent No.: US 8,301,364 B2  
(45) Date of Patent: Oct. 30, 2012

(54) METHOD OF OPERATING A NAVIGATION SYSTEM TO PROVIDE GEOGRAPHIC LOCATION INFORMATION

(75) Inventors: Daniel Rolf, Berlin (DE); Torsten Sieyers, Buettelborn (DE)

(73) Assignee: Navteq B.V., Veldhoven (NL)

( * ) Notice: Subject to any disclaimer, the term of this patent is extended or adjusted under 35 U.S.C. 154(b) by 348 days.

(21) Appl. No.: 12/694,413

(22) Filed: Jan. 27, 2010

(65) Prior Publication Data

US 2011/0184636 A1    Jul. 28, 2011

(51) Int. Cl.  
*G01C 21/00* (2006.01)

(52) U.S. Cl. .............. 701/200; 701/35; 701/201; 702/2; 707/1; 707/3; 707/100; 707/706; 707/10; 345/601; 375/240.26

(58) Field of Classification Search .................... 701/35, 701/201; 702/2; 707/1, 3, 100, 706, 10; 345/601; 375/240.26  
See application file for complete search history.

(56) References Cited

U.S. PATENT DOCUMENTS

| | | | |
|---|---|---|---|
| 6,934,634 B1* | 8/2005 | Ge | 702/2 |
| 7,039,640 B2* | 5/2006 | Miller et al. | 1/1 |
| 7,257,570 B2* | 8/2007 | Riise et al. | 707/706 |
| 7,469,182 B2* | 12/2008 | Huang et al. | 701/400 |
| 2003/0179906 A1* | 9/2003 | Baker et al. | 382/101 |
| 2003/0225725 A1* | 12/2003 | Miller et al. | 707/1 |
| 2004/0057523 A1* | 3/2004 | Koto et al. | 375/240.26 |
| 2004/0260680 A1* | 12/2004 | Best et al. | 707/3 |
| 2006/0142913 A1* | 6/2006 | Coffee et al. | 701/35 |
| 2006/0170702 A1* | 8/2006 | Paquette | 345/601 |
| 2008/0162513 A1* | 7/2008 | Biard et al. | 707/100 |
| 2008/0228728 A1* | 9/2008 | Frank et al. | 707/3 |
| 2008/0243370 A1* | 10/2008 | Loera et al. | 701/201 |

* cited by examiner

*Primary Examiner* — James Trammell  
*Assistant Examiner* — Sanjeev Malhotra  
(74) *Attorney, Agent, or Firm* — John D. Shutter; Frank J. Kozak; Adil M. Musabji

(57) ABSTRACT

A computer implemented method of operating a navigation system to provide geographic location information is provided. The method comprises receiving a query text string representing a query for a geographic location from a user and obtaining data records that represent a plurality of candidate geographic locations. The method computes a text matching score that indicates how much of the query text string matches a record text string of the candidate geographic location and applies a usage pattern weight to the text matching score to obtain an overall score value for the candidate geographic location. The candidate geographic locations are ranked based on the overall score values.

9 Claims, 4 Drawing Sheets

METHOD OF OPERATING A NAVIGATION SYSTEM TO PROVIDE GEOGRAPHIC LOCATION INFORMATION

BACKGROUND OF THE INVENTION

The present invention relates to a method and system for operating a navigation system, and more particularly to a method and system for geocoding a query for geographic location information using prior usage patterns.

Navigation systems are available that provide end users with various navigation-related functions and features. For example, some navigation systems are able to determine an optimum route to travel along a road network from an origin location to a destination location in a geographic region. Using input from the end user, the navigation system can examine various potential routes between the origin and destination locations to determine the optimum route. The navigation system may then provide the end user with information about the optimum route in the form of guidance that identifies the maneuvers required to be taken by the end user to travel from the origin to the destination location. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

In order to provide some of the navigation-related functions and features, the navigation system obtains a query for geographic location information, such as address information. For example the query is 425 West Randolph, Chicago. Typically, the navigation system geocodes the query. Geocoding is the process of finding associated geographic information, such as geographic coordinates of latitude and longitude, from geographic information of a different format, such as the query comprising the street address. With the geographic coordinates, the navigation system can provide navigation-related functions and features, such as a detailed map showing the geographic location information corresponding to the query on a display.

Although navigation systems provide many important features, there continues to be room for new features and improvements. One area for improvement is how the geocoding process resolves ambiguous queries. Ambiguities often happen because of misspellings or the queries have varying formats with different abbreviations for street address information, such as "Street," "St" "West," and "W." When there are ambiguities, the query may not provide an exact match with reference geographic data of a geographic database; rather, there are several candidate matches. For example, if a user enters "425 Randolph, Chicago" possible candidate locations include "425 West Randolph Street Chicago Illinois" and "425 East Randolph Street Chicago Illinois." Thus, there is a need to accurately and efficiently determine which of candidate locations to present to the user.

SUMMARY OF THE INVENTION

To address these and other objectives, the present invention comprises a computer implemented method for operating a navigation system to provide geographic location information. The method comprises receiving a query for a geographic location from a user and obtains data records that represent a plurality of candidate geographic locations from a geographic database stored on a computer readable medium. Each of the data records comprises a record text string. The method computes a text matching score for each of the candidate geographic locations; the text matching score indicates how much of the query text string matches the record text string. For each of the candidate geographic locations, the method applies a usage pattern weight of the candidate geographic location to the text matching score of the candidate geographic location to obtain an overall score value for the candidate geographic location. The usage pattern weight is increased when users have selected the candidate geographic location and decreased with a time fade out. The method ranks the candidate geographic locations based on the respective overall score values.

According to another aspect, the present invention comprises a navigation system. The navigation system comprises a geographic database, a computer and a geocoding program executed on the computer. The geocoding program receives a query text string, computes a text matching score for each of a plurality of candidate locations, and ranks the candidate locations by applying a usage pattern weight for the candidate location to the text matching score of the corresponding candidate location. Each of the candidate locations has an associated record text string. The text matching score indicates how much of the query text string and the record text string match. The usage pattern weight indicates a frequency of prior use of the candidate location.

According to a further embodiment, the present invention comprises a computer implemented method of providing information. The method comprises receiving a query text string representing a request for information from a user and obtaining candidate information data records representing candidate information from a database stored on a computer readable medium. Each of the data records comprises a record text string. The method computes a text matching score for each of the candidate information data records; the text matching score indicates a degree of match between the query text string and the record text string. The method computes a ranking score applying a usage pattern weight of the candidate information to the text matching score for each of the candidate information data records. The usage pattern weight represents a frequency of prior demand for the candidate information. The method ranks the candidate information based on the ranking scores.

BRIEF DESCRIPTION OF THE DRAWINGS

An exemplary embodiment of the present invention is described herein with reference to the following drawings.

DETAILED DESCRIPTION OF THE PRESENTLY PREFERRED EMBODIMENTS

I. Navigation System

Figure 1:
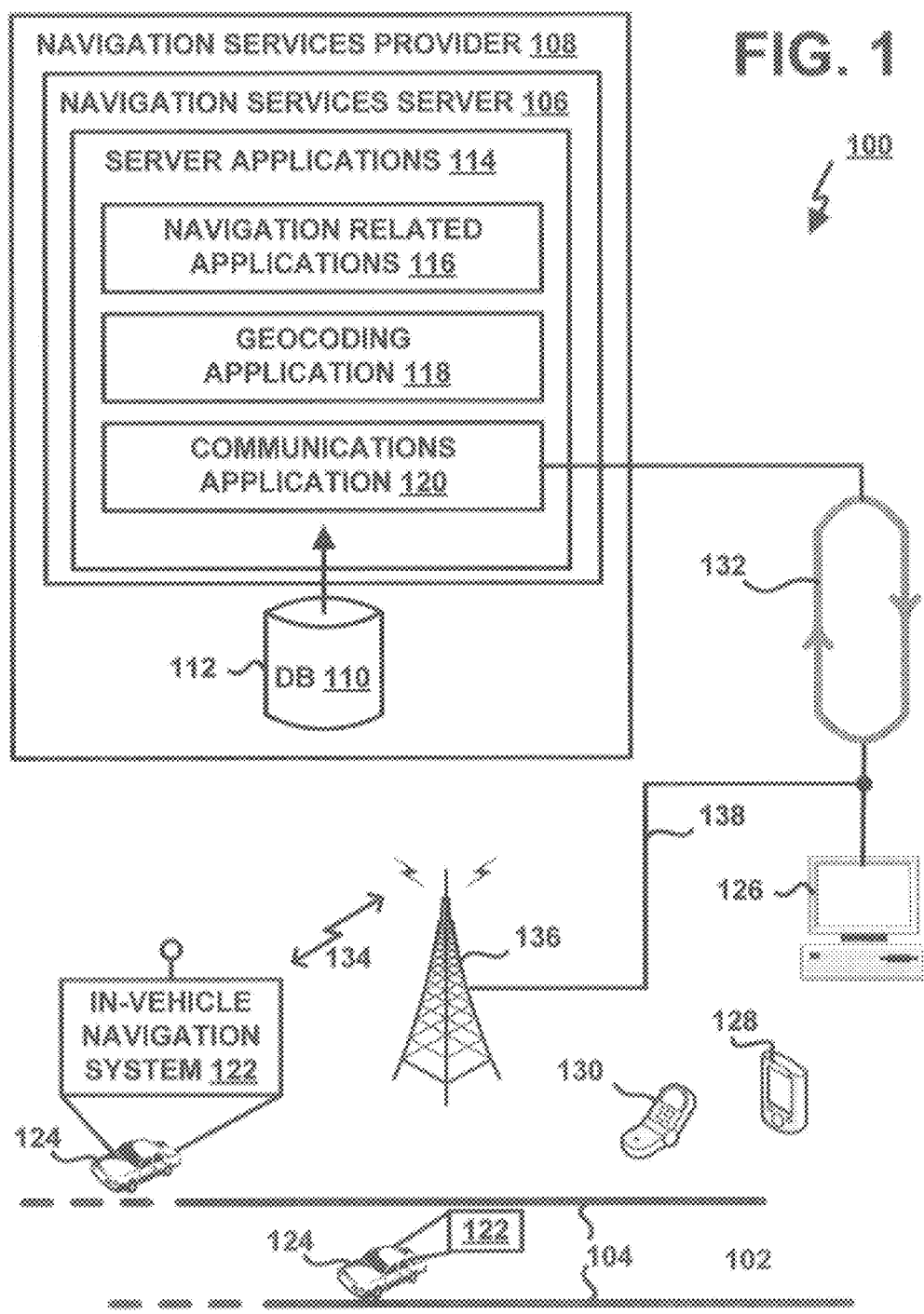
FIG. 1 is a block diagram of a navigation system, according to an exemplary embodiment.

FIG. 1 illustrates an example navigation system 100 for providing navigation related function and features. The navigation system serves end users (e.g., pedestrians, vehicle drivers and passengers, as well as other persons) in a geographic region 100. The navigation system 100 is used by the end users to obtain navigation-related services (including map-related services) with respect to the geographic region 102. The navigation-related services include information about travel along the road network 104 (as well as pedestrian network) in the geographic region 102, including route calculation and guidance, people and business finding services (e.g., electronic yellow and white pages), maps, point of interest searching, destination selection, and so on.

The navigation system 100 is a combination of hardware, software and data. The navigation system 100 includes remote components (i.e., hardware, processors, software or data located at a central location that is remote from the end users) and local components (i.e., hardware, software, or data located physically with each end user). There are various different kinds of mobile or portable computing platforms that provide geographically-related features and services. Included among the remote components of the navigation system 100 is a navigation services server 106. The navigation services server 106 includes appropriate computer hardware and software to run network applications. The navigation services server 106 is maintained and operated by a navigation services provider 108. The navigation services provider 108 may be any entity having a web-based map site.

Associated with the navigation services server 106 is the geographic database 110. The geographic database 110 is stored on a computer readable storage medium 112 or computer storage that is accessible to the navigation services server 106. The storage medium 112 may include one or more hard drives or any type of storage media. The geographic database 110 may be organized to facilitate performing navigation-related functions. In one embodiment, the geographic database 110 is developed by NAVTEQ North America, LLC of Chicago, Ill. However, it is understood that the inventive concepts disclosed herein are not restricted to any particular source of data.

The local components of the navigation system 100 include the various computer platforms operated by the end users to request and obtain navigation-related and map-related features and geographic data from the navigation services provider 108. These various computer platforms (also referred to as "end user computing platforms" or "client computing platforms") may include in-vehicle navigation system units 122 located in vehicles 124, personal computers 126, personal organizers (e.g., PDAs, PalmPilot®-type devices) 128, wireless phones 130, or any other types of computing devices that have the appropriate hardware and software to access the navigation services provider 108 over a communications link 132.

The communications link 132 may use any suitable technology and/or protocols that are currently available, as well as technology and/or protocols that become available in the future. For example, the communications link may use WAP, TCP/IP, etc. More than one protocol may be used in the communications link 132 with appropriate conversions. The communications link 132 may be part of, or connected to, the Internet.

A portion of the communications link 132 may include a wireless portion 134. The wireless portion 134 of the communications link 132 enables two-way communication between the mobile end user computing platforms and the service provider 108. The wireless portion 134 may be implemented by any suitable form of wireless communication, including cellular, PCS, satellite, FM, radio, Bluetooth®, other long and short range transmission technologies or technologies that may be developed in the future. The wireless portion 134 may include one or more transmitters 136, such as a transponder tower, an antenna tower, an FM tower, satellites, other suitable means or others developed in the future. The transmitters 136 include an appropriate communication link 138 to the communications link 132 and/or service provider 108. This link 138 may be land-based or may be wireless. The transmitters 136 include suitable technology that enables two-way communication between the service provider 108 and the mobile end user computing platforms.

Referring to FIG. 1, server applications 114 are included on the navigation services server 106 of the navigation services provider 108. In one embodiment, the server applications 114 may be stored on one or more hard drive(s), computer storage or any other storage media operated by the server 106 and loaded into a memory of the server to run. One of the server applications 114 is a communications application 120. The communications application 120 interfaces with the communication link 132 in order to receive messages from and send messages to the end user computing platforms.

Included among the server applications 114 are navigation-related applications 116. The navigation-related applications 116 use the geographic database 110 associated with the navigation services server 106 in order to provide the various different types of navigation-related services. In order to provide navigation-related features, the navigation-related applications 116 use data from the geographic database 110. One of the navigation-related applications 116 is route calculation. End users may access the navigation services provider 106 to obtain route calculation. Given data that identify the positions of an origin and destination, the route calculation application calculates a route between the origin and the destination. The route calculation application may use any of various means or algorithms for this purpose. Another of the navigation applications on the server 106 is route guidance. Route guidance uses the output from the route calculation application to provide instructions for the end user to travel to the desired destination. Other navigation-related applications 116 provide map generation and display, positioning (e.g., map matching), point of interest and destination search, and so on.

The server applications 114 also include a geocoding application 118. The geocoding application 118 performs a geocoding process that generally translates a user query for location information into some other geographic format. For example, the user query commonly has the form of an address such as "425 W Randolph, Chicago" and the geocoding process translates the input information into some other format, such as a proprietary format or latitude and longitude coordinates. The geocoding process will be described in detail below in conjunction with FIG. 2. The server applications 114 may include other software applications as well.

II. Geocoding Process

Geocoding is the process of finding associated geographic location information, such as geographic coordinates of latitude and longitude, from geographic information of a different format, such as street addresses. With the geographic coordinates, the navigation system can provide navigation-related functions and features, such as a detailed map highlighting the location of the user query on a display associated with the end user computing platform.

Although navigation systems provide many important features, there continues to be room for new features and improvements. One area for improvement is how the geocoding process resolves ambiguous user input location information (or user query). Ambiguities often happen because of missing information, misspellings, errors or the user query has varying formats with different abbreviations for street address information, such as "Street," "St," "West," and "W." When there are ambiguities, the user query may not provide an exact match with reference geographic data of a geographic database; rather, there are several candidate locations. For example, if a user enters "425 Randolph Street Chicago" possible candidate locations include "425 West Randolph Street Chicago Illinois" and "425 East Randolph Street Chicago Illinois" Thus, there is a need to accurately and efficiently determine which of candidate locations to present to the user.

Figure 2:
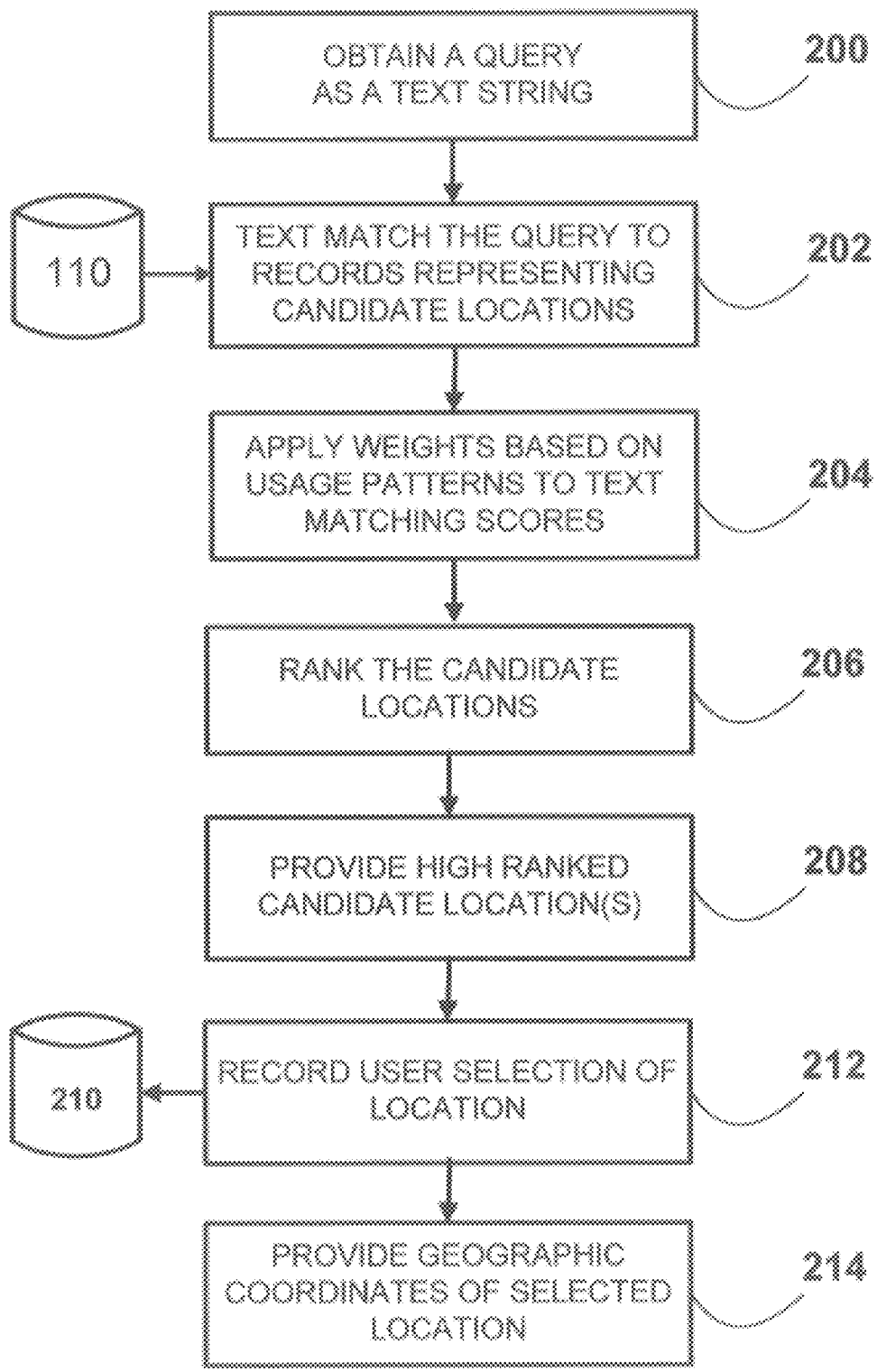
FIG. 2 is a flow chart of a method for geocoding, according to an example embodiment.

FIG. 2 illustrates a flow chart of the geocoding process according to one embodiment. At step 200, the geocoding application 118 obtains a query as a text string. The user enters the query via a user interface on his or her computing platform that is communicated to the navigation services server 106 and provided to the geocoding application 118. For example, the query text string may be "Broadway New York". Alternatively, the query may take different forms including place name, address comprising some of the following: number, street name, city, state, zip code, country and so on. Furthermore, the query may originate as a speech input that is converted into the text string or similar form.

At step 202, the geocoding application 118 compares the query to data records representing known locations or candidate locations. The geocoding application text matches the text string of the query against text strings of the data records representing known locations or candidate locations. The geocoding application 118 obtains the data records representing candidate locations from the geographic database 110. In one embodiment, each record r includes a set of fields F {e.g. Street, City, Zip}, and the record r maps every field in F to a text string. When matching the query against one of the records, the geocoding application 118 computes a text matching score or a set of text matching scores as described in the following.

In one embodiment, the geocoding application 118 performs textual matching by computing for each field a field score $s_f$ representing the amount of the text of the query matching the text in that field of the record. The field score is defined as for every field f is an element of the set F, there is a score $s_f$ with a value between zero and one that indicates how much of a fraction of the text of the query is covered by the text in the field f of the record. For an example query of "Broadway New York" and the Street field of the record r is the text "West Broadway", the score for the Street field $s_{Street}$ would be roughly 0.5 since "Broadway" of the query fits to "Broadway" in the text of the Street field, but the rest of the query ("New York") is not contained in the Street field's text. The score for the City field $s_{City}$ is also computed. For the example query of "Broadway New York" and the City field of the record r is the text "New York City", the score for the City field $s_{City}$ would be roughly 0.5 since "New York" of the query fits to "New York City" in the text of the City field, but the rest of the query ("Broadway") is not contained in the City field's text. Scores for the other fields of the record are computed in a similar manner. Furthermore, field scores for other records of candidate locations are computed in a similar manner.

In one embodiment, the geocoding application 118 uses the field scores $s_f$ to compute a score representing how well the query matched the record. This score $s_r$ represents how much a fraction of the query is covered by the text of the complete record by summing the above computed scores $s_f$ for each field of the record ($s_r=\Sigma s_f$). For example, if the query is "Broadway New York" and the Street field of the record is the text "West Broadway" and the City field of the record is "New York City", the score $s_0$ is 1 since the complete query text is contained in the record's texts.

In another embodiment, the geocoding application 118 computes for each of the fields in the record a text matching score $b_f$ with a value between zero and 1 that indicates how much of a fraction of the text of the field f in the record is contained in the query. For an example query of "Broadway New York" and the Street field of the record r is the text "West Broadway", the score for the Street field $b_{Street}$ would be roughly 0.7 since the "Broadway" portion of the Street field text of the record fits to "Broadway" in the query text, but the rest of the text is not contained in the query text. The score for the City field $b_{City}$ and the other fields of the record are also computed. The scores $b_f$ may also be used to compute a score representing how well the record matched the query. This score $b_0$ represents how much a fraction of the text of the record is covered by the text of the query by summing the above computed scores $b_f$ for each field of the record ($b_0=\Sigma b_f$). The overall score $b_0$ may be normalized to provide a score between 0 and 1. The above are examples of scores for text matching; however, other text matching scores known to those skilled in the art are possible.

After the step of text matching the query to a plurality of records representing different candidate locations (step 202), the geocoding application 118 applies weights based on usage patterns to the text matching scores to obtain an overall score for the candidate location at step 204. The weights based on usage patterns will be described in detail below. The geocoding application 118 computes an overall score $s_0$ for each of the candidate locations by applying to the text matching scores a usage pattern weight for the respective candidate location.

In one embodiment, each record has a usage pattern weight w' that is a value representing a use pattern based on user feedback. As will be described below, the geocoding application 118 presents ranked candidate locations to the user based upon the query, and the user selects one of the presented candidate locations. In one embodiment of the present invention, the user selections or user feedback is recorded and used to determine the value of the usage pattern weight. The usage pattern weight represents a frequency of demand for the candidate location. For an example, a record of Broadway, New York, N.Y. would have a value of 5 for its usage pattern weight w' while a record of Broadway, Yakima, Wash. would have a value of 1 for its usage pattern weight w' because user feedback establishes that a vast majority of users selected the candidate location of Broadway, New York, N.Y. The method for determining the usage pattern weight will be described in more detail below in conjunction with FIG. 4.

In one embodiment, a usage pattern weight w'(f) is assigned to every field in the record. Using a weight for each field of the record, allows the ranking to consider the actual fields that matched between the query text and the record. The overall score $s_0$ (or ranking score) for a record is computed as a sum of the product of the field score $s_f$ and the corresponding usage pattern field weight $w'(f)$.

$$s_0 = \sum_{f \in F} s_f w'(f)$$

Once the overall score for each record of the candidate locations are computed, each overall score may be normalized to provide a score between 0 and 1. Because the usage pattern field weights are not normalized, the overall score is normalized by dividing the overall scores in the results set by the maximum sum of the usage pattern field weights with respect to all records in the results set.

The overall scores for the candidate locations are then used to rank the candidate locations at step 206. The geocoding application 118 ranks the candidate locations into a results set comprising a subset of the candidate locations, such as five, by ranking the candidate locations by their respective overall score. For example, the candidate locations are sorted by their overall score from highest to lowest value and the candidate locations with the highest five scores are identified.

Figure 3:
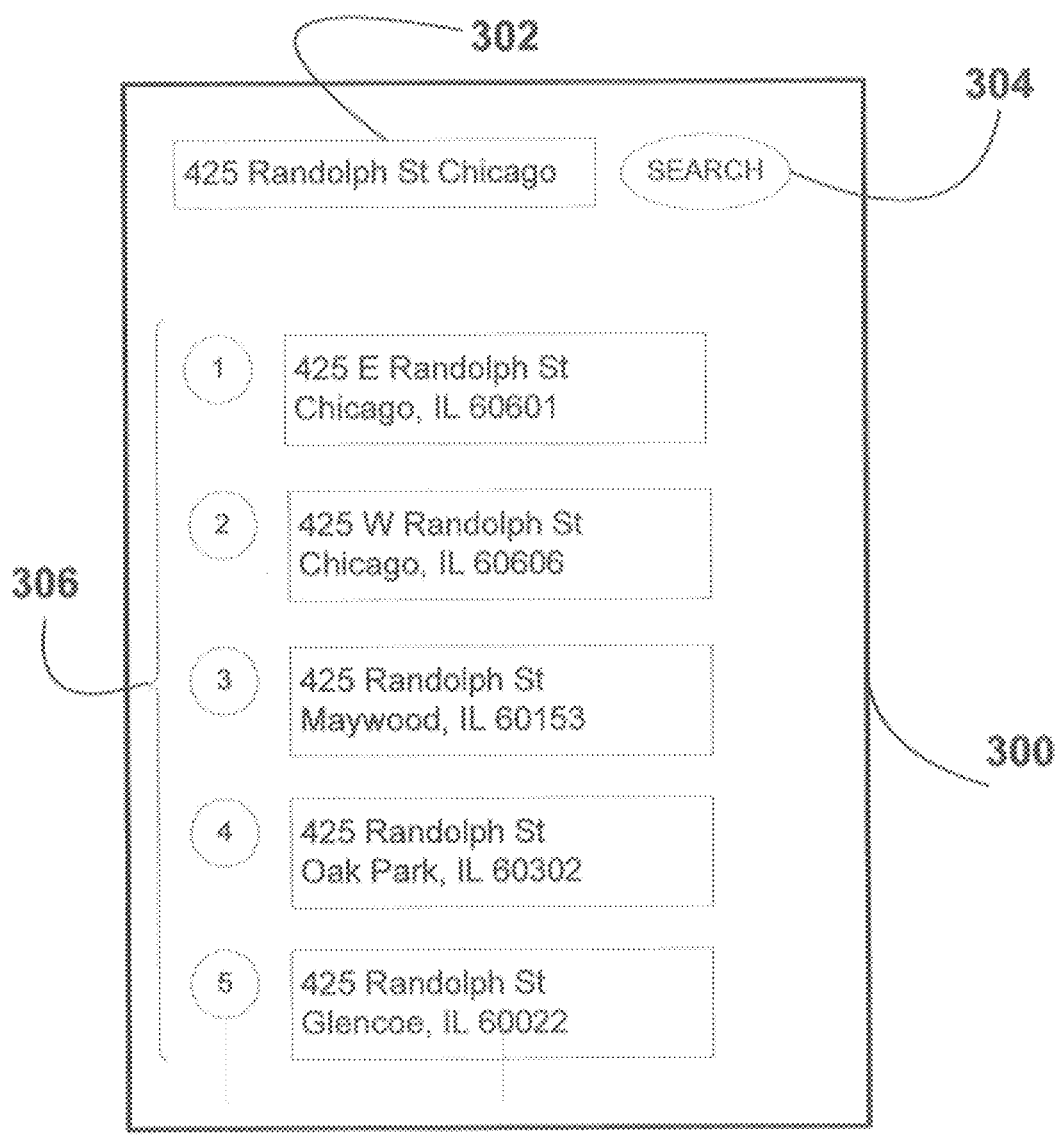
FIG. 3 is a block diagram of a display screen of the navigation system, according to an example embodiment.

At step 208, the geocoding application 118 provides the highest ranked candidate locations as the results set. FIG. 3 illustrates a portion of a display screen 300 on a user computing platform, such as a wireless phone 130. The display screen includes the query "425 Randolph Street Chicago" in a query box 302. The user entered this query and selected the search icon 304 to send the query to the navigation services server 106. Based on the query, the geocoding application 118 has determined a results set of candidate locations matching the query. The navigation services server 106 provides the results set to the user computing platform, and the user computing platform shows the results set 306 on the display screen 300. As shown in FIG. 3, the names of five candidate locations are displayed. The user then selects one of the candidate locations in the results set 306.

In one embodiment, data representing the selected candidate location is sent by the wireless phone 130 to the navigation services server 106. The geocoding application 118 receives the data representing the selected candidate location. At step 212 of FIG. 2, the geocoding application 118 records the user selected candidate location in a geocoder use history database 210. In one embodiment, the geocoding application 118 stores a time stamp, the user selected candidate location and corresponding field scores $s_f$ and field weight values $w(f)$ in the geocoder use history database 210.

At step 214, the geocoding application 118 provides the geographic coordinates (latitude, longitude and altitude) of the user selected candidate location to one of the navigation related applications 116 of the navigation services server 106. For example, the geocoding application 118 provides the geographic coordinates to a routing application that uses the geographic coordinates as an intended destination for a route. In another embodiment, the geocoding application 118 performs steps 208 and 214 together. That is, the geocoding application 118 provides the highest ranked candidate locations as the results set and provides the geographic coordinates (latitude, longitude and altitude) of the results set to one of the navigation related applications 116 of the navigation services server 106 without the user selection.

Figure 4:
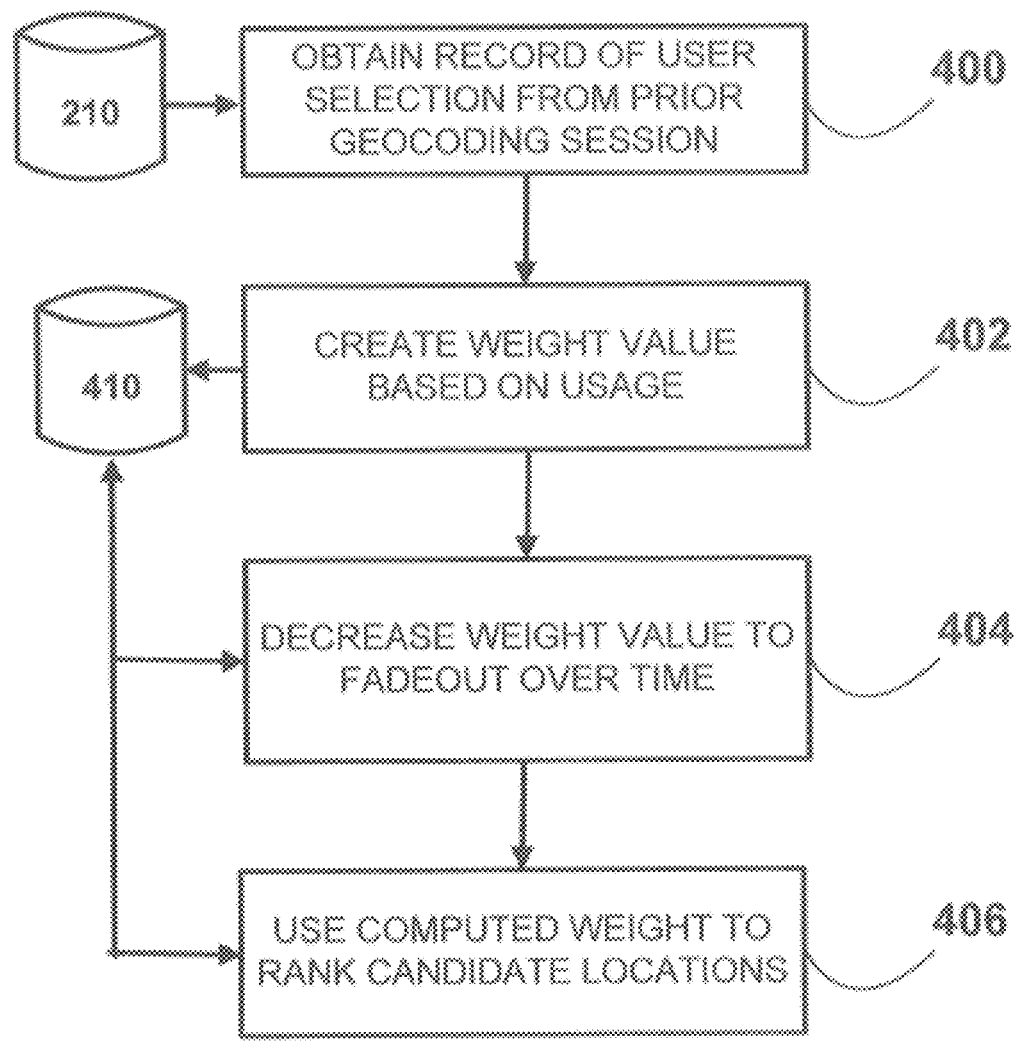
FIG. 4 is a flow chart of a method for determining usage pattern field weights, according to an example embodiment.

As discussed above, the geocoding application 118 applies usage pattern weights to rank candidate locations. FIG. 4 is a flow chart illustrating the steps performed by the geocoding application 118 to determine the usage pattern weights. At step 400, the geocoding application 118 obtains a record of user selection from a prior geocoding session from the geocoder use history database 210. In one embodiment, the record identifies the result or candidate location selected by the user, as well the corresponding field scores $s_f$ and field weight values $w(f)$ used during the last geocoding procedure. The initial values for the field weight values before being modified by usage patterns may be based on static attribution of overall importance, such as by population.

At step 402, the geocoding application 118 creates usage pattern field weight values using the usage pattern of the candidate location by increasing the field weight values for the candidate location that has been selected by a user in a prior geocoding session. In one embodiment, the geocoding application 118 increases the field weight values $w(f)$ depending on the field scores $s_f$ of the record of the selected location as follows:

$$w'(f) = w(f) \cdot (1 + s_f y)$$

In the equation, a variable y indicates an overall increase value of the weight. The variable y is multiplied by field scores $s_f$ so the respective weight values are increased due to their actual matching field scores $s_f$ to provide increasing weight values for fields that had a good match with the query. To determine the value of variable y that indicates the overall increase for the weight, a variable σ is defined as a constant. To increase the overall score $(\sigma s_0)$ for the candidate location at the next time the same query is requested, the new field weights $w'(f)$ satisfy the following equations.

$$\sigma \cdot s_0 = \sum_{f \in F} s_f w'(f)$$

The value for y that indicates the overall increase for the weight is found by the following equations.

$$\sigma \cdot s_0 = \sum_{f \in F} s_f w'(f)$$

$$\sigma \cdot s_0 = \sum_{f \in F} s_f w(f) * (1 + s_f \cdot y)$$

$$\sigma \cdot s_0 = \sum_{f \in F} s_f w(f) + y \cdot \sum_{f \in F} s_f^2 w(f)$$

$$\sigma \cdot s_0 = s_0 + y \cdot \sum_{f \in F} s_f^2 w(f)$$

So the value of y is represented by the following equation.

$$y = \frac{(\sigma - 1) \cdot s_0}{\sum_{f \in F} s_f^2 w(f)}$$

The choice of the variable σ determines how fast the geocoder adapts to a new usage pattern. The value of σ may be chosen to capture new usage patterns quickly. The geocoding application 118 stores the usage pattern field weight values in a field weight database 410.

At step 404, the geocoding application 118 decreases the usage pattern field weight values. The geocoding application 118 obtains the usage pattern field weight values from the field weight database 410. In one embodiment, the geocoding application 118 applies an exponential time fade out to the weights to forget the old usage patterns. The following equation is used to compute the new field weights with the time fade out.

$$w'(f) = w(f) \cdot 2^{-\frac{\alpha}{\tau}}$$

Where τ is the half-life of the weights, such as one week, and α is the time since the last fadeout. The usage pattern field weights that have been reduced by the time fade out are stored in the field weight database 410 along with a time stamp of the last date and time that the fade out was applied to the weights. In alternative embodiments, other types of time fade out are applied to the weights, such as a linear time fade out, a time fade out that force the weight to zero once the usage pattern ceases, and other types of time fade outs.

At step 406, the geocoding application 118 may access the field weight database 410 and obtain the field weights for the geocoding process show in FIG. 2. In another embodiment, the geocoding application 118 performs the steps of FIG. 4 during the geocoding process of FIG. 2. In a further embodiment, the usage pattern field weights for the candidate location are modified each time a user selection is recorded for a geocoding session to capture the user feedback.

The geocoding process using usage pattern weights provide significant advantages. The geocoding process described above integrates user feedback into the ranking to provide results that are more adaptive to actual usage patterns. This allows the geocoding process to dynamically capture current usage and rank higher those candidate locations that are currently in demand and frequently selected. For example, during soccer worldcup season, public viewing areas tend to be frequently requested and selected; the above geocoding process would capture the high current usage of the public viewing areas and rank these locations higher based upon the usage pattern. Additionally, the above geocoding process fades out past usage such as when the worldcup season is finished, interest in the public viewing areas ceases, and the geocoding process lowers the rank of these locations after the end of the season.

In another embodiment, the usage pattern weight for the respective candidate location is increased based on users actually visiting the location. That is, the end user computer platforms and/or the navigation server 106 include positioning systems that determine the location of the end user computing platforms. Using the location data provided by the positioning system, the geocoding application 118 may determine whether the user actually goes to the location associated with the selected candidate location provided by the geocoding process.

In another embodiment, the usage pattern weights may be determined using real time crowd sourcing data that indicates the locations of numerous users of computing platforms. In this embodiment, those candidate locations that currently have a greater number of users at their respective locations have larger usage pattern weights as compared to candidate locations that have fewer users at their respective location. Similarly, the usage pattern weights may be determined using historic crowd sourcing data that indicates the past locations of numerous users of computing platforms. In this embodiment, those candidate locations that had a greater number of users at their respective locations have larger usage pattern weights as compared to candidate locations that had fewer users at their respective location.

For example, if the real time crowd sourcing data indicates a greater number of users located at 425 West Randolph Street Chicago as compared to 425 East Randolph Street Chicago, the usage pattern weight for 425 West Randolph Street Chicago is greater than that for 425 East Randolph Street Chicago. Similarly, if historic crowd sourcing data indicates that a greater number of users have visited 425 West Randolph Street Chicago over a time period as compared to 425 East Randolph Street Chicago, the usage pattern weight for 425 West Randolph Street Chicago is greater than that for 425 East Randolph Street Chicago.

In a further embodiment, the usage pattern weights are modeled to have different values for different times of the day, days of the week and seasons of the year. For example, a candidate location associated with an office building has a larger usage pattern weight during business hours than after business hours. Likewise a live music venue has a larger usage pattern weight in the evening and night as compared to daytime.

The above process has been described in conjunction with geocoding; however, the above process of text matching and applying weights based on usage patterns to rank candidates may be readily applied to other processes including business and people finding applications as well as search engines.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A computer implemented method of operating a navigation system to provide geographic location information, the method comprising:
receiving a query text string representing a query for a geographic location from a user;
obtaining data records that represent a plurality of candidate geographic locations from a geographic database stored on a computer readable medium, each of the data records comprising a record text string;
computing a text matching score for each of the candidate geographic locations, wherein the text matching score indicates how much of the query text string matches the record text string;
for each of the plurality of candidate geographic locations, applying a usage pattern weight of one of the candidate geographic locations to the text matching score of one of the candidate geographic locations to obtain an overall score value for the one of the candidate geographic locations, wherein the usage pattern weight is increased when users have selected the one of the candidate geographic locations and decreased with a time fade out; and
ranking by computer the candidate geographic locations based on the respective overall score values,
wherein the overall score value $s_0$ is calculated from the usage pattern weight $w'(f)$ and the text matching score $s_f$ according to:

$$s_0 = \sum s_f w'(f),$$

and wherein the time fade out is defined by a predetermined half-life of the usage pattern weight and an amount of time elapsed from a preceding time fade out.

2. The method of claim 1 further comprising:

providing the candidate geographic locations that have the highest overall score values;

receiving a selection of the one of the candidate geographic locations from the user; and increasing the usage pattern weight for the one of the candidate geographic locations that was selected.

3. The method of claim 2 further comprising:

recording the selection of the one of the candidate geographic locations on a computer readable storage medium.

4. The method of claim 1 wherein the time fade out is an exponential time fade out.

5. The method of claim 1 wherein the data record that represents the candidate geographic location comprises a street field with a street text string and a city field with a city text string.

6. The method of claim 5 wherein the text matching score comprises a street field score and a city field score.

7. The method of claim 5 wherein the usage pattern weight comprises a usage pattern street field weight and a usage pattern city field weight.

8. The method of claim 1 wherein the users select the one the candidate geographic locations by traveling to the one of the candidate geographic locations.

9. The method of claim 1, wherein the predetermined half-life of the usage pattern weight is one week.

* * * * *